United States Patent
Fallon et al.

(10) Patent No.: US 8,571,966 B2
(45) Date of Patent: Oct. 29, 2013

(54) CREDIT DEFAULT SWAP POST CREDIT EVENT

(75) Inventors: Kevin Fallon, Salem, WI (US); Nicholas Bellios, Evanston, IL (US); Ketan Patel, Hanover Park, IL (US); Scimeca Giuseppe, Chicago, IL (US)

(73) Assignee: Chicago Mercantile Exchange, Chicago, IL (US)

( * ) Notice: Subject to any disclaimer, the term of this patent is extended or adjusted under 35 U.S.C. 154(b) by 213 days.

(21) Appl. No.: 12/637,455

(22) Filed: Dec. 14, 2009

(65) Prior Publication Data

US 2011/0145123 A1 Jun. 16, 2011

(51) Int. Cl.
*G06Q 40/00* (2012.01)
(52) U.S. Cl.
USPC .......................................................... 705/37
(58) Field of Classification Search
USPC .......................................................... 705/37
See application file for complete search history.

(56) References Cited

U.S. PATENT DOCUMENTS

| | | | |
|---|---|---|---|
| 2003/0208422 A1* | 11/2003 | Burczyk | 705/35 |
| 2004/0162862 A1 | 8/2004 | Hull et al. | |
| 2005/0144104 A1 | 6/2005 | Kastel | |
| 2007/0239576 A1 | 10/2007 | Hirani et al. | |
| 2008/0195519 A1 | 8/2008 | Stevens | |
| 2009/0012892 A1 | 1/2009 | Biase | |
| 2009/0099946 A1* | 4/2009 | Kelley | 705/35 |
| 2009/0299916 A1 | 12/2009 | Glinberg et al. | |

OTHER PUBLICATIONS

PCT/US10/60302 International Search Report dated Mar. 8, 2011.
International Preliminary Report on Patentability and Written Opinion in PCT/US2010/060302 issued Jun. 19, 2012.

* cited by examiner

*Primary Examiner* — Lindsay M. Maguire
(74) *Attorney, Agent, or Firm* — Banner & Witcoff, Ltd.

(57) ABSTRACT

Methods, systems and apparatuses are described for determining that a credit event has occurred for an entity; determining an upfront price and a bond price for a credit default swap deliverable (CDSD) contract associated with the entity; determining a first weighting for the upfront price and a second weighting for the bond price; and calculating a settlement price for the CDSD contract that is a function of the first weighting, the second weighting, the upfront price, and the bond price.

23 Claims, 2 Drawing Sheets

CREDIT DEFAULT SWAP POST CREDIT EVENT

BACKGROUND

A (CDS) is a credit derivative contract between two counterparties where a protection buyer makes periodic payments to a protection seller, and receives a payoff if an underlying financial instrument defaults or if a company undergoes restructuring, bankruptcy, or upon the occurrence of another contractually stipulated event. The spread of the CDS is the amount the protection buyer must pay the protection seller over the length of the contract, which can be expressed as a percentage of a notional amount. For example, if the CDS spread of a company is 100 basis points, or 1.0% (1 basis point=0.01%), then an investor buying $10 million worth of protection must pay $100,000. Payments made by the protection buyer continue until either the CDS contract expires or a credit event occurs (e.g., company defaults). A higher CDS spread is a higher fee charged to protect against a company defaulting and indicates that the company is considered more likely to default by the market.

BRIEF SUMMARY

Methods, systems and apparatuses are described for determining that a credit event has occurred for an entity; determining an upfront price and a bond price for a credit default swap deliverable (CDSD) contract associated with the entity; determining a first weighting for the upfront price and a second weighting for the bond price; and calculating a settlement price for the CDSD contract that is a function of the first weighting, the second weighting, the upfront price, and the bond price.

Of course, the methods, apparatuses, and systems of the above-referenced embodiments may also include other additional elements, steps, computer-executable instructions, or computer-readable data structures. In this regard, other embodiments are disclosed and claimed herein as well. The example embodiments can be partially or wholly implemented on a computer-readable medium, for example, by storing computer-executable instructions or modules, or by utilizing computer-readable data structures that when executed, cause an apparatus or processor to perform the operations described herein.

The details of these and other embodiments are set forth in the accompanying drawings and the description below. Other features and advantages will be apparent from the description, drawings, and claims.

BRIEF DESCRIPTION OF DRAWINGS

The example embodiments may take physical form in certain parts and steps, embodiments of which will be described in detail in the following description and illustrated in the accompanying drawings that form a part hereof, wherein.

DETAILED DESCRIPTION

Figure 1:
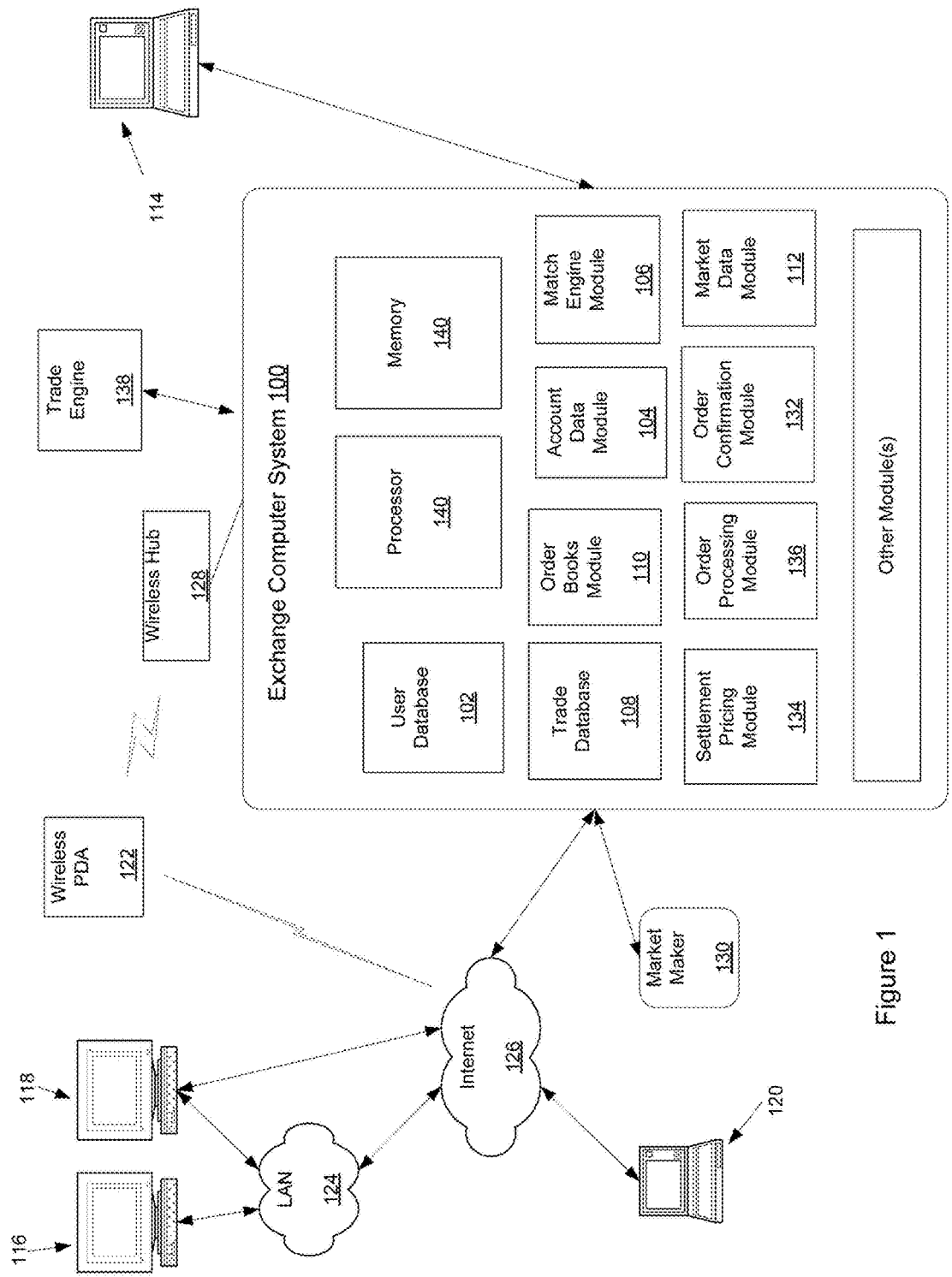
FIG. 1 depicts an illustrative operating environment that may be used to implement various aspects of the example embodiments.

FIG. 1 depicts an illustrative operating environment that may be used to implement various aspects of the example embodiments. The operating environment is only one example of a suitable operating environment and is not intended to suggest any limitation as to the scope of use or functionality of the present disclosure. Aspects of the present disclosure are preferably implemented with computer devices and computer networks that allow the exchange/transmission/reception of information including, but not limited to performance bond amount requirements and trading information. An exchange computer system 100 receives market data, analyzes historical data, and may calculate various values, e.g., settlement prices, performance bond amounts, etc., in accordance with aspects of the present disclosure.

Exchange computer system 100 may be implemented with one or more mainframes, servers, gateways, controllers, desktops or other computers. The exchange computer system 100 may include one or more modules, processors, databases, and other components, such as those illustrated in FIG. 1. Moreover, exchange computer system 100 may include one or more processors 140 (e.g., Intel® microprocessor, AMD® microprocessor, risk processor, etc.) and one or more memories 142 (e.g., solid state, DRAM, SRAM, ROM, Flash, non-volatile memory, hard drive, registers, buffers, etc.) In addition, an electronic trading system 138, such as the Globex® trading system, may be associated with an exchange. In such an embodiment, the electronic trading system includes a combination of globally distributed computers, controllers, servers, networks, gateways, routers, databases, memory, and other electronic data processing and routing devices. The trading system may include a trading system interface having devices configured to route incoming messages to an appropriate devices associated with the trading system. The trading system interface may include computers, controllers, networks, gateways, routers and other electronic data processing and routing devices. Orders that are placed with or submitted to the trading system are received at the trading system interface. The trading system interface routes the order to an appropriate device.

A match engine module 106 may match bid and offer prices for orders configured in accordance with aspects of the present disclosure. Match engine module 106 may be implemented with software that executes one or more algorithms for matching bids and offers for bundled financial instruments in accordance with aspects of the present disclosure. The match engine module and trading system interface may be separate and distinct modules or component or may be unitary parts. Match engine module may be configured to match orders submitted to the trading system. The match engine module may match orders according to currently known or later developed trade matching practices and processes. In an embodiment, bids and orders are matched on price, on a First In First Out (FIFO) basis. The matching algorithm also may match orders on a pro-rata basis or combination of FIFO and pro rata basis. Other processes and/or matching processes may also be employed.

Furthermore, an order book module 110 may be included to compute or otherwise determine current bid and offer prices. The order book module 110 may be configured to calculate the price of a financial instrument. Moreover, a trade database 108 may be included to store historical information identifying trades and descriptions of trades. In particular, a trade database may store information identifying or associated with the time that an order was executed and the contract price. The trade database 108 may also comprise a storage device configured to store at least part of the orders submitted by electronic devices operated by traders (and/or other users). In addition, an order confirmation module 132 may be configured to provide a confirmation message when the match engine module 106 finds a match for an order and the order is subsequently executed. The confirmation message may, in some embodiments, be an e-mail message to a trader, an electronic notification in one of various formats, or any other form of generating a notification of an order execution.

A market data module 112 may be included to collect market data and prepare the data for transmission to users. In addition, a settlement pricing module 134 may be included in exchange computer system 100 to perform settlement of trades. An order processing module 136 may be included to receive data associated with an order for a financial instrument. The module 136 may decompose delta based and bulk order types for processing by order book module 110 and match engine module 106. The order processing module 136 may be configured to process the data associated with the orders for financial instruments.

A user database 102 may include information identifying traders, dealers, and other users of exchange computer system 100. Such information may include user names and passwords. A trader or dealer operating an electronic device (e.g., computer devices 114, 116, 118, 120 and 122) interacting with the exchange computer system 100 may be authenticated against user names and passwords stored in the user database 102. Furthermore, an account data module 104 may process account information that may be used during trades. The account information may be specific to the particular trader (or user) of an electronic device interacting with the exchange computer system 100.

The trading network environment shown in FIG. 1 includes computer (i.e., electronic) devices 114, 116, 118, 120 and 122. The computer devices 114, 116, 118, 120 and 122 may include one or more processors, or controllers, that control the overall operation of the computer. The computer devices 114, 116, 118, 120 and 122 may include one or more system buses that connect the processor to one or more components, such as a network card or modem. The computer devices 114, 116, 118, 120 and 122 may also include interface units and drives for reading and writing data or files. Depending on the type of computer device, a user can interact with the computer with a keyboard, pointing device, microphone, pen device or other input device. For example the electronic device may be a personal computer, laptop or handheld computer, tablet pc and like computing devices having a user interface. The electronic device may be a dedicated function device such as personal communications device, a portable or desktop telephone, a personal digital assistant ("PDA"), remote control device, personal digital media system and similar electronic devices.

Computer device 114 is shown communicatively connected to exchange computer system 100. Exchange computer system 100 and computer device 114 may be connected via a T1 line, a common local area network (LAN) a wireless communication device or any other mechanism for communicatively connecting computer devices. Computer (i.e., electronic) devices 116 and 118 are coupled to a local area network ("LAN") 124. LAN 124 may have one or more of the well-known LAN topologies and may use a variety of different protocols, such as Ethernet. Computers 116 and 118 may communicate with each other and other computers and devices connected to LAN 124. Computers and other devices may be connected to LAN 124 via twisted pair wires, coaxial cable, fiber optics or other media. Alternatively, a wireless personal digital assistant device (PDA) 122 may communicate with LAN 124 or the Internet 126 via radio waves. PDA 122 may also communicate with exchange computer system 100 via a conventional wireless hub 128. As used herein, a wireless PDA 122 includes mobile telephones and other devices that communicate with a network via radio waves. FIG. 1 also shows LAN 124 connected to the Internet 126. LAN 124 may include a router to connect LAN 124 to the Internet 126. Computer device 120 is shown connected directly to the Internet 126, however, the connection may be via a modem, DSL line, satellite dish or any other device for communicatively connecting a computer device to the Internet.

The operations of computer devices and systems shown in FIG. 1 may be controlled by computer-executable instructions stored on computer-readable storage medium. Embodiments also may take the form of electronic hardware, computer software, firmware, including object and/or source code, and/or combinations thereof. Embodiments may be stored on computer-readable media installed on, deployed by, resident on, invoked by and/or used by one or more data processors (e.g., risk processor), controllers, computers, clients, servers, gateways, networks of computers, and/or any combinations thereof. The computers, servers, gateways, may have one or more controllers configured to execute instructions embodied as computer software. For example, computer device 114 may include computer-executable instructions for receiving interest rate and other information from exchange computer system 100 and displaying to a user. In another example, computer device 118 may include computer-executable instructions for receiving market data from exchange computer system 100 and displaying that information to a user. In yet another example, a processor 140 of exchange computer system 100 may be configured to execute computer-executable instructions that cause the system 100 to calculate a performance bond amount required to balance risk associated with a portfolio.

Of course, numerous additional servers, computers, handheld devices, personal digital assistants, telephones and other devices may also be connected to exchange computer system 100. Moreover, one skilled in the art will appreciate that the topology shown in FIG. 1 is merely an example and that the components shown in FIG. 1 may be connected by numerous alternative topologies.

The example embodiments provide systems, apparatuses, and methods that determine a settlement price (i.e., marked-to-market value) of single name credit default swap deliverable (CDSD) contracts held in a Clearing House implemented by the exchange computer system 100. The exchange computer system 100 may determine settlement prices for CDSD contracts at predetermined times (e.g., twice a day corresponding with when the London and New York markets close) to facilitate trading of the CDSD contracts after a credit event occurs.

Before the credit event, a CDSD contract of single name entity may trade in quote spreads in basis points. The quote spread may be the spread in basis points derived from the upfront price using the International Swaps and Derivatives Association CDS Standard Model, using a market standard recovery rate (e.g., 40% recovery rate for senior, and 25% for subordinate debt) and flat term structure (e.g., standardized quote of 120 bps against a 100 bps coupon). Other quote spreads may also be used.

As the entity becomes more distressed, the quote spread may dramatically increase (e.g., go from 50 basis points to 1000 basis points) and the CDSD contract may quoted using upfront pricing, rather than using the quote spread. The upfront price may be defined as a percentage of the notional amount of the trade that the protection buyer pays the protection seller, in addition to the running standard coupon (e.g., five year protection on GE is 7.6% upfront at 500 bps). Other methods for defining an upfront price may also be used.

When a credit event occurs, parties may have long and short positions in the CDSD contract. Conventionally, an auction is conducted on what dealers think the CDSD contract of a defaulting entity is worth a predetermined number of days (e.g., 30 days) after the occurrence of the credit event. Conventional systems provide the parties with two options after the credit event is identified: wait and take delivery under the CDSD contract; or if they want out sooner, use upfront pricing to determine a settlement price for the CDSD contract.

As the auction date approaches, trading of CDSD contracts based on upfront prices becomes very illiquid. To price the CDSD contracts, traders often have to rely on where a bond for the CDSD contract is trading. In some instances, however, there are many more CDSD contracts than bonds. The auction price, however, is based on bids and offers for the bonds. The example embodiments described herein may determine settlement prices for CDSD contracts at predetermined times to facilitate trading of the CDSD contracts after a credit event occurs prior to the auction date.

Figure 2:
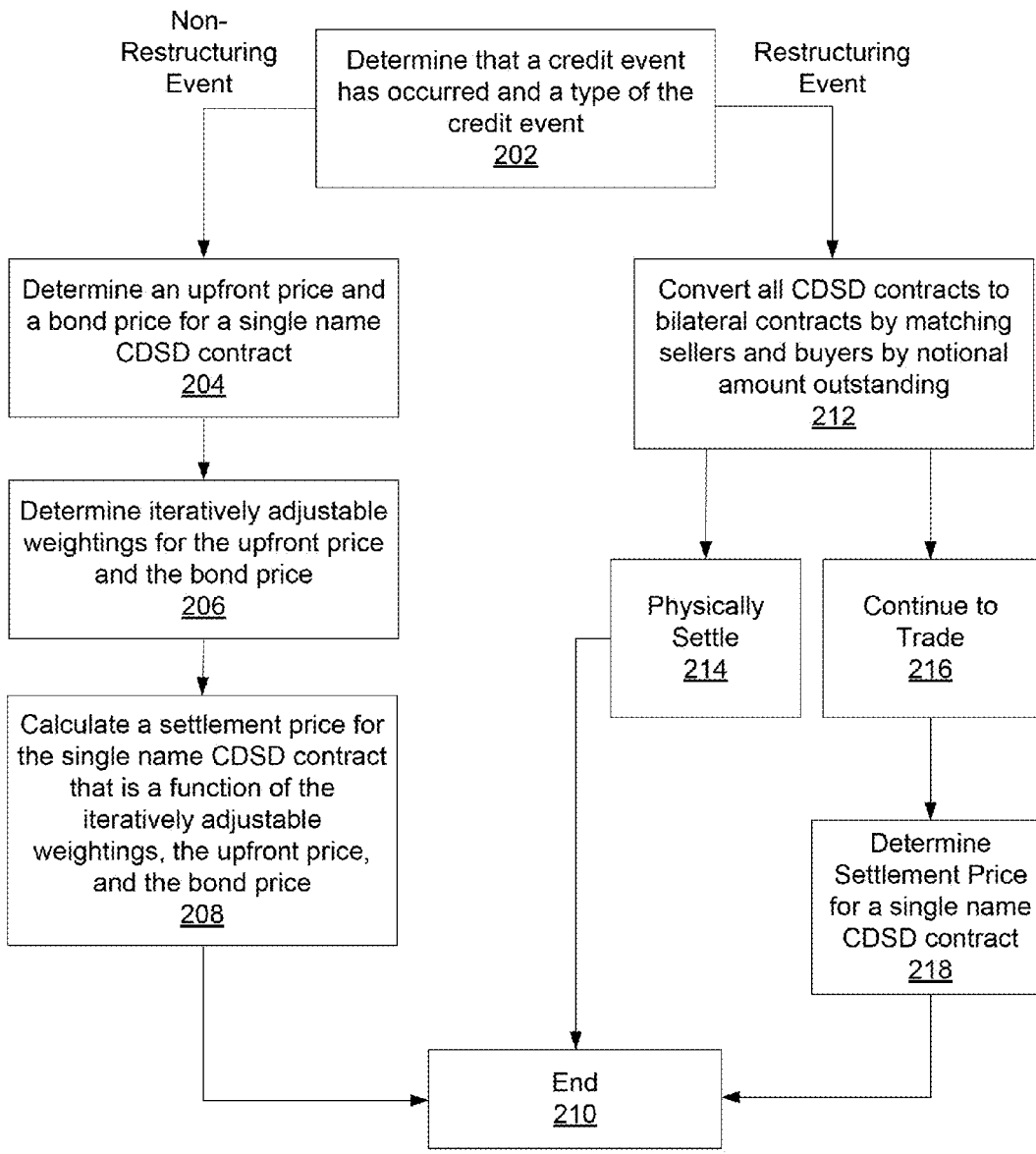
FIG. 2 illustrates an example flow diagram of a method for determining a settlement price of a CDSD contract.

FIG. 2 illustrates an example flow diagram of a method for determining a settlement price of a CDSD contract. The method may be implemented on the exchange computer system 100.

In block 202, the method may include determining that a credit event has occurred for an entity and a type of the credit event. In an example embodiment, the exchange computer system 100 may receive a credit event message from the International Swaps and Derivatives Association (ISDA), an Exchange Determination Board (e.g., Chicago Mercantile Exchange Determination Board) or other entity deeming that a credit event has occurred for the entity. Examples of a credit event types include (a) a non-restructuring credit event (e.g., bankruptcy or failure to pay) and (b) a restructuring credit event.

The credit event message may also identify a Credit Event Determination (CED) date, a Credit Event Effective (CEE) date, a Credit Event Processing (CEP) date, or any combination thereof. The CED date may be the date that the ISDA or the Exchange Determinations Board announces that a credit event has occurred. The CEE date may be as early as 60 days prior to the CED date. The CEP date may be the date that the exchange computer system 100 begins processing CDSD contracts for the entity, and may be on or after the CED date. If the credit event is a non-restructuring event, the method may proceed to block 204. If the credit event is a restructuring event, the method may proceed to block 212.

In block 204, the method may include determining an upfront price and a bond price for the CDSD contract associated with the entity. For a non-restructuring credit event, the exchange computer system 100 may determine an end-of-period upfront price for the CDSD contract. In an example embodiment, the exchange computer system 100 may receive upfront pricing messages from one or more dealer computers 114 providing a dealer estimate for the upfront price of the CDSD contract. The exchange computer system 100 may then average or otherwise process the dealer upfront prices to determine the upfront price used by the exchange computer system 100.

Also, the exchange computer system 100 may require that at least a quorum of dealers (e.g., 4 or more) provide upfront prices for averaging. If less than a quorum respond, the exchange computer system 100 may make market observations, such as on bid/ask prices for the CDSD contract, to obtain an upfront price for use in the average. The exchange computer system 100 may also use prices of a cheapest-to-deliver (CTD) bond on the CDSD contract to supplement the dealer upfront prices to determine the average upfront price. The exchange computer system 100 may identify the cheapest-to-deliver (CTD) bond among a list of deliverable bonds per ISDA protocol and may collect the price of the CTD bond. The exchange computer system 100 may also limit which bonds qualify as the CTD bond. For example, the exchange computer system 100 may limit the CTD bonds to those where a volume of the most recent bond trade is greater than a predetermined amount (e.g., $1 million). The exchange computer system 100 may determine that no suitable CTD bonds are available if the volume is less than the predetermined amount. An upfront price based on the CTD bond price may be 100% minus the CTD bond price. For example, if a bond price is 15%, then an upfront price based on the bond price may be 85% (i.e., 100%-15%=85%).

In block 206, the method may include determining iteratively adjustable weightings. The iteratively adjustable weightings may change over time and may adjust the proportion of the settlement price that is attributed to the upfront price and the bond price. The iteratively adjustable weightings may adjust over time to reflect the portion of the settlement price attributable to the bond price and the upfront price of the CDSD contract between the time the credit event is identified and the auction date. For example, at the beginning of the 30 days preceding an auction, the exchange computer system 100 may more heavily weight the settlement price based on the upfront price to reflect the supply and demand of people deciding to get out of the CDSD contract via an upfront level. As the 30 day cycle approaches the auction date, the exchange computer system 100 may more heavily weight the settlement price using the bond price for the CDSD contract. The exchange computer system 100 therefore may adjust the iteratively adjustable weightings over time to increase the proportion of the settlement price attributable to the bond price, and to decrease proportion of the settlement price attributable to the upfront price.

Initially, to determine the iteratively adjustable weightings, the exchange computer system 100 may determine whether both the upfront price and the CTD bond price are available. If neither is available, the exchange computer system 100 may use the previous day's price as the settlement price. If only one or the other is available, the exchange computer system 100 may use the available price (i.e., bond price or upfront price) as the settlement price. If both are available, the exchange computer system 100 may calculate weightings for the upfront price and the bond price. For example, the exchange computer system 100 may determine iteratively adjustable weights X, Y and Z based on an initial 99.5% confidence interval, where the iterations are determined at predefined time intervals (e.g., hours, days, etc.)

For time period T=0:

$Y = 99.5\%$ or $0.995$ $X = Y^2 + 0$ $Z = (1-X)$

At time period T=1:

$Y_{T=1} = X_{T=0}^2 + 0$

X and Z are determined as shown above.

At time period T=2

$Y_{T=2} = X_{T=1}^2 + 0$

Thus, for time period T, $Y_T = X_{T-1}^2 + 0$. In other words, over time, the proportion of the settlement price attributed to the bond price may exponentially increase and to the upfront price may exponentially decrease.

Table 1, below, provides an example of the iteratively adjustable weightings beginning on the date a credit event is identified.

TABLE 1

| | Day | Y | X | Z |
|---|---|---|---|---|
| Credit Event | 1 | 0.995 | 0.990025 | 0.009975 |
| | 2 | 0.990025 | 0.980149501 | 0.01985 |
| | 3 | 0.98015 | 0.960693044 | 0.039307 |
| | 4 | 0.960693 | 0.922931124 | 0.077069 |
| | 5 | 0.922931 | 0.85180186 | 0.148198 |
| | 6 | 0.851802 | 0.725566408 | 0.274434 |
| | 7 | 0.725566 | 0.526446612 | 0.473553 |
| | 8 | 0.526447 | 0.277146036 | 0.722854 |
| | 9 | 0.277146 | 0.076809925 | 0.92319 |
| | 10 | 0.07681 | 0.005899765 | 0.9941 |
| | 11 | 0.0059 | 3.48072E−05 | 0.999965 |

These weights X, Y, and Z may be tailored or refined to reflect empirical or other data to more accurately reflect the value and risk associated with a given CDSD contract.

In block 208, the method may include calculating a settlement price for the single name CDSD contract that is a function of the iteratively adjustable weightings, the bond price, and the upfront price. In an example embodiment, the exchange computer system 100 may determine a settlement price (Ws) for the CDSD contract of a defaulted entity W as a function of the Bond Price (Wz) and the Upfront Price (Wy) using the following equation:

$$\text{CDSD settlement price } (Ws) = ((100 - Wy) * X) + (Z * Wz) \quad \text{Eqn (1)}$$

For example, if:
Bond Price (Wz)=13.5
Upfront Price (Wy)=85.5
then the CDSD settlement price (Ws) on day 3 based on the values of X and Z from table 2 below may be determined to be:

$$\text{CDSD settlement price } (Ws) = ((100 - 85.5) * 0.96) + (0.04 * 13.5) = 14.46$$

The values in Table 2 below reflect the proportion of the settlement price attributed to the upfront price and to the bond price over time.

TABLE 2

| Day | Bond Price Weight X | Upfront Price Weight Y |
|---|---|---|
| 1 | 1% | 99% |
| 2 | 2% | 98% |
| 3 | 4% | 96% |
| 4 | 8% | 92% |
| 5 | 15% | 85% |
| 6 | 27% | 73% |
| 7 | 47% | 53% |
| 8 | 72% | 28% |
| 9 | 92% | 8% |
| 10 | 99% | 1% |
| 11 | 100% | 0% |

In table 2, the bond price and the upfront price are weighted approximately equally at day 7, and thereafter the percentage of the settlement price attributed to the bond price increases and to the upfront price decreases.

The exchange computer system 100 may determine the settlement price as per this methodology for all tenors of CDSD contracts. Table 3 below further presents an example of various values of a CTD bond price, a 1—Upfront price, a CTD bond weight, an upfront weight, and a single name CDSD price, and how these values change over time based on a credit event identified on Jan. 14, 2009.

TABLE 3

| Date | CTD Bond price | 1-Upfront | CTD Bond weight | Upfront weight | CDSD-price |
|---|---|---|---|---|---|
| Jan. 14, 2009 | 16.75 | 18.74 | 1% | 99% | 18.72 |
| Jan. 15, 2009 | 16.50 | 17.56 | 2% | 98% | 17.54 |
| Jan. 16, 2009 | 16.50 | 18.58 | 4% | 96% | 18.50 |
| Jan. 20, 2009 | 16.75 | 18.58 | 8% | 92% | 18.44 |
| Jan. 21, 2009 | 17.25 | 18.80 | 15% | 85% | 18.57 |
| Jan. 22, 2009 | 17.63 | 18.09 | 27% | 73% | 17.96 |
| Jan. 23, 2009 | 16.92 | 18.72 | 47% | 53% | 17.87 |
| Jan. 26, 2009 | 16.92 | 18.22 | 72% | 28% | 17.28 |
| Jan. 27, 2009 | 16.92 | 18.08 | 92% | 8% | 17.01 |
| Jan. 28, 2009 | 16.92 | 17.54 | 99% | 1% | 16.92 |
| Jan. 29, 2009 | 14.00 | 16.75 | 100% | 0% | 14.00 |
| Jan. 30, 2009 | 14.00 | 16.44 | 100% | 0% | 14.00 |
| Feb. 2, 2009 | 14.00 | 15.93 | 100% | 0% | 14.00 |
| Feb. 3, 2009 | 14.00 | 16.40 | 100% | 0% | 14.00 |
| Feb. 4, 2009 | 14.00 | 16.54 | 100% | 0% | 14.00 |
| Feb. 5, 2009 | 15.25 | 17.00 | 100% | 0% | 15.25 |
| Feb. 6, 2009 | 15.25 | 15.50 | 100% | 0% | 15.25 |
| Feb. 9, 2009 | 15.25 | 14.37 | 100% | 0% | 15.25 |
| Feb. 10, 2009 | 12.00 | 14.50 | 100% | 0% | 12.00 |
| Auction: | | 12.00 | | | |

From block 208, the method may then proceed to block 210 and end. Returning to block 202, the method may determine that the credit event is a restructuring credit event and may proceed to block 212.

In block 212, the method may include converting all CDSD contracts to bilateral contracts by matching sellers and buyers by notional amount outstanding. For example, the exchange computer system 100 may match sellers and buyers by notional amount outstanding to convert all CDSD contracts to bilateral contracts. Matched buyer and seller pairs may either physically settle or continue to trade. If physically settling, the method may proceed to block 214. If continuing to trade, the method may proceed to block 216.

In block 214, the method may include the matched buyer and seller pairs physically settling. In an example embodiment, the protection buyer delivers the notional amount of deliverable obligations of the defaulting entity to the protection seller in return for the notional amount paid in cash. After physically settling, the method may proceed to block 210 and end.

Referring again to block 212, if continuing to trade, the method may proceed to block 216. In block 216, the method may include the continued trading of the CDSD contracts and may proceed to block 218.

In block 218, the method may include determining a daily settlement price for a single name CDSD contract. For example, the exchange computer system 100 may gather prices for each of the tenors available for the CDSD contracts and executed prices, quoted prices, and position marks for the affected CDSD contracts. The method of FIG. 2 may then end.

The present disclosure has been described herein with reference to specific exemplary embodiments thereof. It will be apparent to those skilled in the art that a person understanding this disclosure may conceive of changes or other embodiments or variations, which utilize the principles of this disclosure without departing from the broader spirit and scope of the disclosure as set forth in the appended claims. For example, although numerous examples recite CDSD contracts, one skilled in the art will appreciate that the novel principles disclosed herein may be applied to other types of financial instruments and still fall within the scope of the disclosure contemplated herein.

We claim:

1. A computer implemented method comprising:
   determining that a credit event has occurred for an entity;
   determining an upfront price and a bond price for a credit default swap deliverable (CDSD) contract associated with the entity;
   determining a weighting for the upfront price and a weighting for the bond price;
   iteratively adjusting the upfront price weighting and the bond price weighting so that the upfront price weighting decreases over time and so that the bond price weighting increases over time; and
   calculating, by a processor, a settlement price for the CDSD contract that is a function of the upfront price weighting, the bond price weighting, the upfront price, and the bond price.

2. The method of claim 1, further comprising;
   recalculating the settlement price in response to the iterative adjustment.

3. The method of claim 1, wherein iteratively adjusting the upfront price weighting and the bond price weighting comprises iteratively adjusting the upfront price weighting and the bond price weighting so that the upfront price weighting exponentially decreases and the bond price weighting exponentially increases over time.

4. The method of claim 1, further comprising receiving a plurality of estimated upfront prices for the CDSD contract.

5. The method of claim 4, further comprising:
   determining that the plurality of estimated upfront prices are less than a quorum; and
   calculating at least one other estimated upfront price based on the bond price, wherein the upfront price is an average of the estimated upfront prices and the at least one other estimated upfront price.

6. The method of claim 4, further comprising:
   determining that the plurality of estimated upfront prices are less than a quorum; and
   analyzing market data to determine bid and ask prices for the CDSD contract to obtain at least one other estimated upfront price, wherein the upfront price is an average of the estimated upfront prices and the at least one other estimated upfront price.

7. The method of claim 1 wherein
   the determining that the credit event has occurred comprises determining that a non-restructuring credit event has occurred, and
   the determining the upfront price and the bond price, the determining the upfront price weighting and the bond price weighting, the iteratively adjusting the upfront price weighting and the bond price weighting, and the calculating a settlement price are performed in response to the determination that a non-restructuring credit event has occurred.

8. An apparatus comprising:
   a processor; and
   a memory storing computer executable instructions that, when executed, cause the apparatus to perform operations comprising:
      determining that a credit event has occurred for an entity;
      determining an upfront price and a bond price for a credit default swap deliverable (CDSD) contract associated with the entity;
      determining a weighting for the upfront price and a weighting for the bond price;
      iteratively adjusting the upfront price weighting and the bond price weighting so that the upfront price weighting decreases over time and so that the bond price weighting increases over time and
      calculating a settlement price for the CDSD contract that is a function of the upfront price weighting, the bond price weighting, the upfront price, and the bond price.

9. The apparatus of claim 8, wherein the computer executable instructions, when executed, cause the apparatus to perform operations comprising:
   recalculating the settlement price in response to the iterative adjustment.

10. The apparatus of claim 8, wherein iteratively adjusting the upfront price weighting and the bond price weighting comprises iteratively adjusting the upfront price weighting and the bond price weighting so that the upfront price weighting exponentially decreases and the bond price weighting exponentially increases over time.

11. The apparatus of claim 8, wherein the computer executable instructions, when executed, cause the apparatus to perform operations comprising receiving a plurality of estimated upfront prices for the CDSD contract.

12. The apparatus of claim 11, wherein the computer executable instructions, when executed, cause the apparatus to perform operations comprising determining that the plurality of estimated upfront prices are less than a quorum.

13. The apparatus of claim 12, wherein the computer executable instructions, when executed, cause the apparatus to perform operations comprising calculating at least one other estimated upfront price based on the bond price, wherein the upfront price is an average of the estimated upfront prices and the at least one other estimated upfront price.

14. The apparatus of claim 12, wherein the computer executable instructions, when executed, cause the apparatus to perform operations comprising analyzing market data to determine bid and ask prices for the CDSD contract to obtain at least one other estimated upfront price, wherein the upfront price is an average of the estimated upfront prices and the at least one other estimated upfront price.

15. The apparatus of claim 8 wherein
   the determining that the credit event has occurred comprises determining that a non-restructuring credit event has occurred, and
   the determining the upfront price and the bond price, the determining the upfront price weighting and the bond price weighting, the iteratively adjusting the upfront price weighting and the bond price weighting, and the calculating a settlement price are performed in response to the determination that a non-restructuring credit event has occurred.

16. A computer readable medium storing computer executable instructions that, when executed, cause an apparatus to perform operations comprising:
   determining that a credit event has occurred for an entity;
   determining an upfront price and a bond price for a credit default swap deliverable (CDSD) contract associated with the entity;
   determining a weighting for the upfront price and a weighting for the bond price;
   iteratively adjusting the upfront price weighting and the bond price weighting so that the upfront price weighting decreases over time and so that the bond price weighting increases over time; and
   calculating a settlement price for the CDSD contract that is a function of the upfront price weighting, the bond price weighting, the upfront price, and the bond price.

17. The computer readable medium of claim 16, wherein the computer executable instructions, when executed, cause the apparatus to perform operations comprising:
recalculating the settlement price in response to the iterative adjustment.

18. The computer readable medium of claim 16, wherein iteratively adjusting the upfront price weighting and the bond price weighting comprises iteratively adjusting the upfront price weighting and the bond price weighting so that the upfront price weighting exponentially decreases and the bond price weighting exponentially increases over time.

19. The computer readable medium of claim 16, wherein the computer executable instructions, when executed, cause the apparatus to perform operations comprising receiving a plurality of estimated upfront prices for the CDSD contract.

20. The computer readable medium of claim 19, wherein the computer executable instructions, when executed, cause the apparatus to perform operations comprising determining that the plurality of estimated upfront prices are less than a quorum.

21. The computer readable medium of claim 20, wherein the computer executable instructions, when executed, cause the apparatus to perform operations comprising calculating at least one other estimated upfront price based on the bond price, wherein the upfront price is an average of the estimated upfront prices and the at least one other estimated upfront price.

22. The computer readable medium of claim 20, wherein the computer executable instructions, when executed, cause the apparatus to perform operations comprising analyzing market data to determine bid and ask prices for the CDSD contract to obtain at least one other estimated upfront price, wherein the upfront price is an average of the estimated upfront prices and the at least one other estimated upfront price.

23. The computer readable medium of claim 16 wherein
the determining that the credit event has occurred comprises determining that a non-restructuring credit event has occurred, and
the determining the upfront price and the bond price, the determining the upfront price weighting and the bond price weighting, the iteratively adjusting the upfront price weighting and the bond price weighting, and the calculating a settlement price are performed in response to the determination that a non-restructuring credit event has occurred.

* * * * *